June 26, 1928. Re. 17,008

H. E. TOLLE ET AL

LIQUID DISPENSING MEANS

Original Filed Dec. 15, 1924 2 Sheets-Sheet 1

INVENTOR.

Howard E. Tolle
Herman J. Tolle
BY
S. B. Whitehead
ATTORNEY

June 26, 1928.

Re. 17,008

H. E. TOLLE ET AL

LIQUID DISPENSING MEANS

Original Filed Dec. 15, 1924 2 Sheets-Sheet 2

Howard E. Tolle
Verner H. Tolle
BY
D. S. Whittemore
ATTORNEY.

INVENTOR.

Reissued June 26, 1928. Re. 17,008

UNITED STATES PATENT OFFICE.

HOWARD E. TOLLE AND VERNER A. TOLLE, OF DAYTON, OHIO, ASSIGNORS OF ONE-THIRD TO PAUL A. TOLLE.

LIQUID-DISPENSING MEANS.

Original No. 1,599,105, dated September 7, 1926, Serial No. 756,065, filed December 15, 1924. Application for reissue filed November 21, 1927. Serial No. 234,880.

This invention relates to improvements in liquid dispensing means.

In the accompanying drawings which serve for illustrating the invention:

Figures 4, 5, 6, 7:
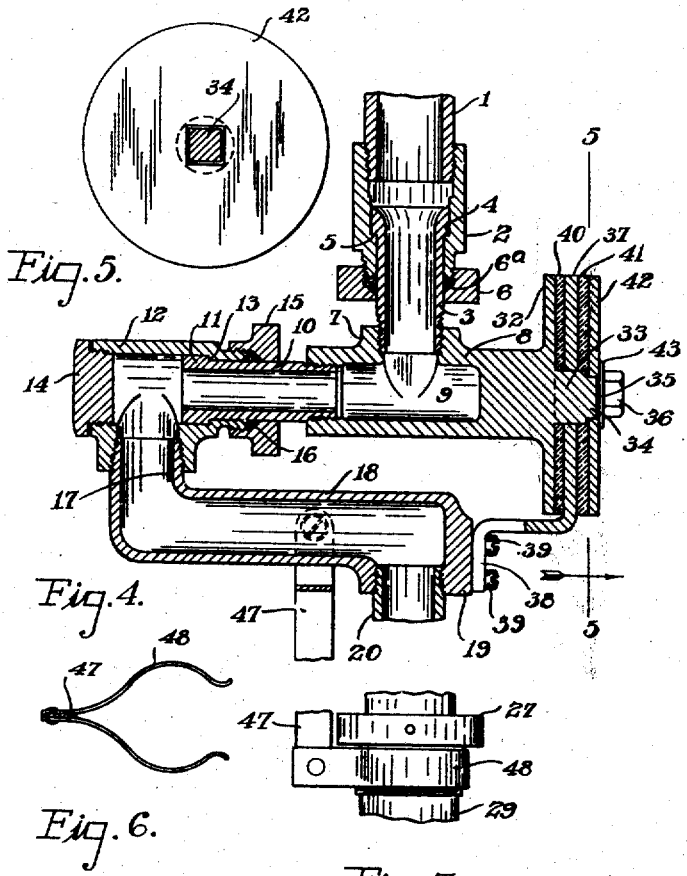
Fig. 4 is a detail sectional view taken on line 4—4 of Fig. 2.
Fig. 5 is a detail sectional view taken on line 5—5 of Fig. 4.

Figs. 6—7 are detail views of a holder for the liquid dispensing device when not in use.

The invention consists, as here shown, in a telescopically arranged, extendible tube including a section of flexible hose, adapted to be attached at one end to a source of liquid supply, as the discharge outlet of a liquid dispensing pump, and to be extended and connected at its opposite end to a receptacle for receiving liquid dispensed through the tube, as the gasoline tank of a motor vehicle, the extendible tube being a substitute for the common type of hose used on liquid dispensing pumps.

The objects attained in the invention consist in a metallic tube comprising a plurality of telescopically arranged, extendible tubes connected to the source of liquid supply by a variably adjustable joint which compensates for the various turns and angular positions of the tube which are necessary for making straight line connections to the supply tanks of automobiles, the section of ordinary flexible hose at the delivery end of the tube serving for effecting the connections to the tanks readily in the usual range of positions of the machines relative to the pump.

The straight line extension of the metallic tube serves the double purpose of overcoming flexing and the torsional stresses of the hose, which result in ordinary liquid dispensing hose incident to draining the liquid therefrom, and of insuring complete draining of the tube and full measure of liquid to the customer.

In ordinary liquid dispensing hose, as is well known, the hose must be raised at its intermediate portion, upon each dispensing of liquid, for draining the hose and giving full measure to the customer, which has the effect of flexing and exerting torsional stresses on the hose, particularly near the point where it is connected to the pump, and results in a short time in breaking the tube at that point, and shortening the life of the hose. The necessity of holding the hose in raised position also results frequently in failure to effect complete drainage of the hose and, accordingly, in delivering short measure of liquid to the customer.

Referring to the accompanying drawings, the numeral 1 designates a discharge tube on a liquid dispensing pump or tank (not shown). The tube 1 is exteriorly threaded at its lower end to receive an internally threaded coupling sleeve 2 by which there is connected to the tube 1, an intermediate tube 3. The latter is formed with an external annular shoulder 4 which is engaged by an annular internal shoulder 5 on the coupling sleeve 2 that is externally threaded at its lower end to receive a nut 6. The lower wall of the coupling sleeve 2 is beveled inwardly to form an enlarged cavity within the nut, for suitable packing material 6[a] which is pressed against the outer surface of the tube 3 for effecting a liquid tight connection between the tubes 1 and 3. (See Figures 1, 2 and 4.)

At its outer end the tube 3 is exteriorly threaded for connecting it to a threaded boss 7 on a cylindrical casting 8 into which there is preferably drilled from one end, a hole 9 that communicates with the outer end of tube 3 through the boss 7. The inner end of the casting 8 is internally threaded around the hole 9 to receive the externally threaded end of a tube 10 that is formed at its outer end with an external annular shoulder 11. Before the tube 10 is screwed into the casting 8, it is forced through a T 12 until its shoulder 11 engages an annular shoulder 13 formed within the T. Threaded into the outer end of the cross portion of the T 12 is a cap nut 14, while there is applied to its inner end, which is externally threaded, a sleeve nut 15 to press suitable packing material 16 against the inner edge of the T and the external surface of the tube 10, to effect a liquid tight connection between the latter and the T. (See Figures 1 and 4.)

Figure 3:
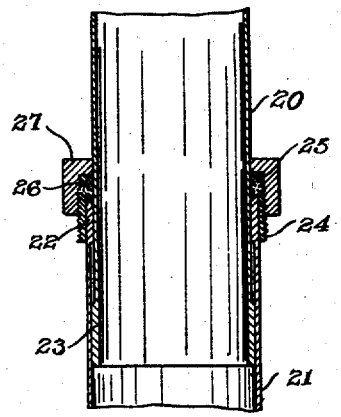
Fig. 3 is a detail sectional view of a telescopic joint for extending the mechanism.

Threaded into the side outlet of the T 12 is one right-angled end 17 of a tubular casting 18 which is in substantial parallelism with the casting 8. The casting 18 is formed, preferably in radial alinement with the boss 7, with a right-angled bend 19 that is tapped to receive the inner end of a tube 20. The outer end of this tube 20 telescopes into a tube 21, the inner wall of which is formed with an annular enlargement 22 which is adapted to be engaged by an annular shoulder 23 formed on the outer end of the tube 20 to prevent the tube 21 from being pulled off. (See Figures 1 and 3.)

Surrounding the inner end of the tube 21 is an exteriorly threaded sleeve 24 the inner edge of which is chamfered. Between this sleeve 24 and a gland 25 beyond it, is suitable packing 26 which is adapted to be pressed against the tube 20 by the gland when a sleeve nut 27 is screwed onto the sleeve. (See Figure 3.) A liquid tight connection is thus formed between the telescopic tubes 20 and 21 without interfering with the axial movement of the tube 21 over the tube 20.

The tube 21 is telescopically connected in a similar manner to a tube 28, and the latter in a like manner to a tube 29. Secured in a liquid tight manner to the outer end of the tube 29 is a short section of flexible hose 30 to the outer end of which a nozzle 31 is secured. (See Figure 1.)

Formed on the close end of the casting 8, is a wide flange 32. Axially projecting beyond the latter from the casting 8 is a cylindrical extension 33 terminating in a squared reduced portion 34. (See Figures 4 and 5.) The extension 33 ends beyond its squared portion in a reduced round end 35 which is externally threaded to receive a nut 36. (See Figure 4.)

Free to revolve upon the axial projection 33, is a metal disc 37 which is formed at its inner end with an extension that is turned to provide a part 38 parallel with its disc part for attachment by suitable fastening elements such as screws 39, to the end surface of the bend 19 of the casting 18. Between the disc 37 and the flange 32 on the casting 8, is a friction disc 40 and between disc 37 and a disc 42 applied to the squared portion 34 of the extension 33 of the casting is a friction disc 41. (See Figure 4.)

Mounted on the end 35 of the casting extension 33 is a washer 43 which is adapted to be engaged by the nut 36 to press the disc 42, with the desired degree of tension, against the remaining discs and the flange 32 on the casting to control the frictional resistance which the fiber discs 40 and 41 offer to the rotation of the metal disc 37 on the casting extension 33.

Figure 1:
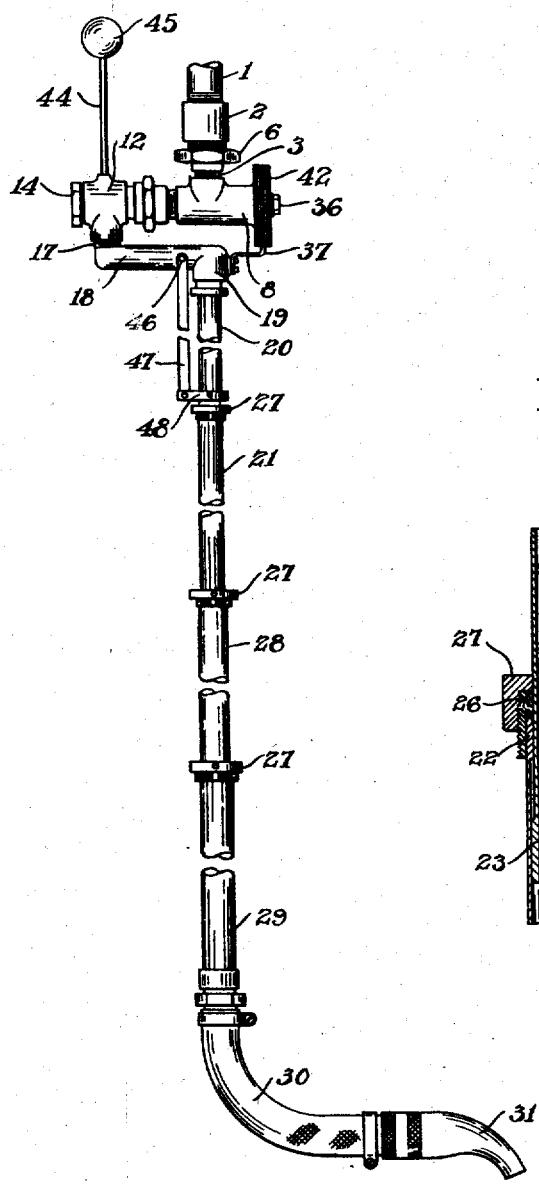
Fig. 1 is a view in side elevation of the improved mechanism.
Figure 2:
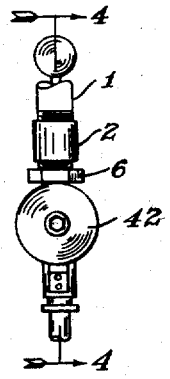
Fig. 2 is a detail view of a joint for connecting the mechanism to a source of liquid supply.

Referring to Figure 1, there is secured to the T 12, opposite its side outlet, an arm 44 which carries on its outer end a counterweight 45 for the purpose of balancing the telescopic delivery tube unit. However, this counterweight may be dispensed with if desired.

Pivotally secured by a screw 46 to the middle portion of the casting 18, is an arm 47 to the outer end of which is secured a spring-fork clamping member 48 which is adapted to be applied to the tube 29 below the sleeve nut 27 on its inner end, to hold the telescopic tubes in their nested positions. (See Figures 1, 4, 6 and 7.)

The tube 3 is free to revolve within the coupling 2, to enable the device to be turned about the axis of the pump outlet tube 1. With the T 12 free to be revolved about the tube 10, and the metal disc 37 free to be turned around the casting extension 33, the telescopic tube unit may be raised and lowered when desired. This telescopic tube unit, being balanced by the counterweight 45, may be easily raised and lowered by a filling station attendant, and held in an adjusted position by the frictional resistance offered to the rotation of the metal disc 37 by the fiber discs 40 and 41. Furthermore, the telescopic unit may be easily extended or contracted to bring the nozzle 31 directly over the opening in an automobile tank, into which the full amount of liquid fuel drawn from the pump will flow, since there are no pockets or loops in the device to trap it.

While the extendible tubes, as here shown, are provided with suitable packing at the joints, it will be seen that leakage at the joints will not occur in the normal use of the tubes as liquid dispensing means of the character claimed, as the flow of the liquid is from the smaller to larger tubes, the outer ends of the sections at the joints being extended in inverse direction to the movement of the liquid, and there being no back pressure on the liquid, leakage at the joints will not occur irrespective of packing of any kind for making the joints liquid tight.

We claim as our invention:

1. Liquid dispensing means comprising a pump outlet, a horizontal tubular structure pivotally connected near its middle portion to said pump outlet, a second tubular structure communicating with, and rotatable about, one end of the horizontal tubular structure, and a pivotal braking connection between the second tubular structure and the other end of the horizontal tubular structure, said second tubular structure having universal manually controllable movement from its connection with the pump outlet.

2. Liquid dispensing means comprising a pump outlet, a horizontal casting open at one end, means for connecting the casting pivotally to said outlet, a tubular structure connected to the open end of said casting for rotation about its longitudinal axis, a disc member rotatably secured to the other end of said casting and having an extension fixed to the tubular structure, a friction disc on each side of the disc member, and means on the casting for pressing the friction discs against the disc member for the purpose specified, said tubular structure having universal manually controllable movement from its connection with the pump outlet.

3. Liquid dispensing means comprising a pump outlet, a right-angled tubular structure connected pivotally to said outlet, a second tubular structure communicating with, and rotatable about, the first tubular structure, a braking connection between the first and second tubular structures, and a counterweight on the second tubular structure to aid its movement about the first tubular structure against the opposition of said braking connection, said second tubular structure having universal manually controllable movement from its connection with the pump outlet.

4. Liquid dispensing means consisting in a plurality of telescopically arranged tubular sections connected pivotally and rotatably by the inner section thereof to the outlet of an elevated source of liquid, and extendible one section relative to another, and a flexible extension of the tubular structure connected to its outer section and adapted to be disposed at an angle thereto for effecting connection with a receptacle for liquid dispensed therethrough, said tubular structure having universal manually controllable movement from its connection with the source of liquid.

5. Liquid dispensing means consisting in a tubular structure comprising a plurality of telescopically arranged tubular sections extendible one section relative to another, liquid-tight joints between adjoining sections, a compensating connection between the inner section of the tubular structure and an elevated source of liquid for adapting the tubular structure for a range of angular movement, and a flexible extension of the tubular structure connected to its outer section and adapted to be disposed at an angle thereto for effecting connection with a receptacle for liquid dispensed therethrough, said tubular structure having universal manually controllable movement from its connection with the source of liquid.

6. Liquid dispensing means consisting in a tubular structure comprising a plurality of telescopically arranged tubular sections extendible one section relative to another, a compensating connection between the inner section of the tubular structure and an elevated source of liquid for adapting the tubular structure to be extended downward therefrom at variable angles, the lower ends of the upper and intermediate sections being extended into the upper ends of adjoining sections, external liquid-tight joints between adjoining sections, and a hose and nozzle extension of the tubular structure at its lower section for effecting connection with a receptacle for liquid dispensed therethrough, said tubular structure having universal manually controllable movement from its connection with the source of liquid.

7. Liquid dispensing means consisting in a tubular structure comprising a plurality of telescopically arranged tubular sections connected pivotally and rotatably by the inner section thereof to the outlet of an elevated source of liquid and extendible variably to lengths greater than the elevation of said source of liquid for effecting connection with a receptacle for liquid dispensed through the tubular structure, and adapted to be retracted and nested one section relative to another and supported when not in use in a length less than the elevation of said source of liquid, said tubular structure having universal manually controllable movement from its connection with the source of liquid.

8. Liquid dispensing means consisting in a tubular structure comprising a plurality of telescopically arranged, metallic sections connected to and extendible downward at variable angles and lengths from an elevated source of liquid for effecting uninterrupted gravity movement of liquid through the tubular structure, and a flexible extension of the tubular structure at the lower end of said metallic sections for effecting connection with a receptacle for liquid dispensed therethrough, said tubular structure having universal manually controllable movement from its connection with the source of liquid.

9. Liquid dispensing means consisting in a tubular structure comprising a plurality of telescopically arranged, metallic tubular sections connected pivotally and rotatably to and extendible downward at variable angles and lengths from an elevated source of liquid for effecting uninterrupted gravity movement of liquid through the tubular structure, and a flexible extension of the tubular structure at the lower end of said metallic sections for effecting connection with a receptacle for liquid dispensed therethrough, said tubular structure having universal manually controllable movement from its connection with the source of liquid.

10. Liquid dispensing means consisting in a plurality of telescopically arranged, extendible tubular sections connected pivotally by the inner section thereof to a tubular structure communicating with and connected rotatably to the outlet of an elevated source of liquid to adapt the tubes for a range of angular movements, and a nozzle flexibly connected to the lower end of the outer section for effecting connection with a receptacle for liquid dispensed therethrough, said tubular structure having universal manually controllable movement from its connection with the source of liquid.

11. Liquid dispensing means consisting in a plurality of telescopically arranged, extendible tubular sections, a compensating connection between the inner section and the outlet of an elevated source of liquid including a tubular structure communicating with and rotatably connected to said outlet and a second tubular structure communicating with and pivotally connected to the first named tubular structure to adapt the tubular sections for a range of angular movements, and a flexibly connected nozzle at the lower end of the tubular structure for effecting connection with a receptacle for liquid dispensed therethrough, said tubular sections having universal manually controllable movement relative to the source of liquid.

12. Liquid dispensing means consisting in a tubular structure comprising a plurality of tubular sections, joined one to another by extendible, telescopic joints, a compensating connection between the inner section and the outlet of an elevated source of liquid, and an extension of the outer section adapted to effect a connection with a receptacle for liquid dispensed through the tubular structure, the ends of the outer sections being extended over the ends of the inner sections at the joints inverse to the direction of movement of the liquid therethrough, said tubular structure having universal manually controllable movement from its connection with the source of liquid.

In testimony whereof, we affix our signatures.

HOWARD E. TOLLE.
VERNER A. TOLLE.